INVENTORS
James W. Brooks
George J. Moss Jr.
BY
ATTORNEY

INVENTORS
James W. Brooks
George J. Moss Jr.
BY [signature]
ATTORNEY

INVENTORS
James W. Brooks
George J. Moss Jr.
BY
ATTORNEY 3,355,711
MAGNETIC TAPE PLAYBACK SYSTEM James W. Brooks and George J. Moss, Jr., Silver Spring, Md., assignors to the United States of America as represented by the Secretary of the Navy Filed Jan. 26, 1965, Ser. No. 428,268
12 Claims. (Cl. 340—172.5)

ABSTRACT OF THE DISCLOSURE

A magnetic tape playback system having readout circuitry for anticipating the presence of data on magnetic tape to give information controlled readout of data, automatic printer control circuitry which advances a chart only when there is data to be printed, and printing control circuitry for controlling the printing of data concurrently with elapsed time in an Arabic numeral format.

The invention described herein may be manufactured and used by or for the Government of the United States of America for governmental purposes without the payment of any royalties thereon or therefor.

The present invention relates to a magnetic tape recording transport and speed up playback system, and more particularly to readout circuitry for anticipating the presence of data on magnetic tape for information controlled readout of data, automatic printer control circuitry which advances a chart only when there is data to be printed out, and printing control circuitry for controlling the printing of data concurrently with the elapsed time in an Arabic numeral format.

In the field of magnetic playback devices, it has been the general practice to either read information directly from a tape transport or indirectly by way of buffer storage devices and printing information on a chart in a binary coded format. In order to interpret the chart, the indications on the chart had to be manually transformed into Arabic numeral notations. With direct readout the amount of chart paper used was far in excess of that needed to display information. Often hundreds of feet of chart paper were used when only a few feet contained useful information. With these systems data analysis became a time consuming and laborious often resulting in human or printing errors.

With the present invention it is possible to play back information from a magnetic tape onto a chart which rapidly provides the analyst with necessary information for a relatively short time of the entire recording time. The system includes a plurality of playback channels for data and one channel for control purposes. An elapsed time counter such as the one described in Patent No. 3,202,999 of George J. Moss, Jr. causes the elapsed time to be permanently recorded in Arabic numeral notation on a moving chart. An external event is detected in either a direct or an erasure mode and causes a data anticipation signal to be recorded on a control channel a short distance ahead of the event information. A readout control channel picks up the control information a short time before the arrival of the data and starts a chart control mechanism. The Arabic numeral time counter and the readout control channel provide the necessary controls for advancing the chart only when there is information to be printed and for controlling the printing of the elapsed time in Arabic numeral format along with the corresponding event data.

An object therefore is to detect event information a predetermined time in advance of the information for initiating the movement of a printout chart.

Another object is to provide scanning and recording circuitry for magnetic tape playback which will in one mode detect erasures of prerecorded signals and in another mode directly detect random pulse events, and which in each mode will record a data present control signal in a space on the magnetic tape.

A further object is the provision of a magnetic tape transport playback system which detects random event information, keeps track of the elapsed time, starts a chart recorder a short time in advance of the actual playback of the events, and permanently prints a record of random pulse events and their time of occurrence, in an Arabic numeral format.

Another object is the provision of delay circuitry in the playback control channel for delaying the chart advance signal so that the chart will not start its movement too soon thus permitting flexibility in the spacing between the scanning and recording heads of the playback data anticipation circuitry.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates a portion of playback circuitry including the magnetic tape transport and detector circuitry;

FIG. 4 illustrates the manner in which FIGS. 1 and 3 are joined; and

In the present embodiment of the invention the tape recorder (not shown) is a self-operating magnetic tape event recorder which is capable of continuously monitoring certain physical phenomena occurring over a period of 20 days and recording the physical phenomena as events on one reel of tape. Signals are recorded on magnetic tape in either a direct mode or an erasure mode. When a direct mode is used, an event is represented by several cycles of a square wave recorded on a previously blank tape. When an erasure mode is used, an event is represented by an erasure of a prerecorded sine wave.

It is necessary to know not only the nature of the events recorded, but also the day and time at which each event occurred. Elapsed time can be determined by either of two methods. In one method a 0.5 cycle per second square wave is recorded on one of the channels such as channel 5 of the magnetic tape 100. The signal from the timing channel is full-wave rectified during the playback process, and the result is an electrical pulse corresponding to each second of elapsed time. The Arabic numeral time accumulator counts these pulses in units of days, hours, minutes and seconds.

A simpler and less accurate method of time determination is possible if the speed of the tape reel is regulated to produce one revolution per each 90 minutes of elapsed time by means of an escapement mechanism so that in playback it is known that each complete rotation of the tape's supply reel is equivalent to 90 minutes of elapsed time. With this method a wheel (not shown) having 90 slots is mounted on the supply reel shaft of the playback transport. A light beam from a photo cell passes through the slots as the shaft rotates so that each time a slot on the wheel passes the photo cell, an electrical pulse appears at the terminals of the photo cell Each pulse corresponds to one minute of elapsed time and is counted by the Arabic numeral time counter in units of days, hours and minutes.

Figures 1, 4:
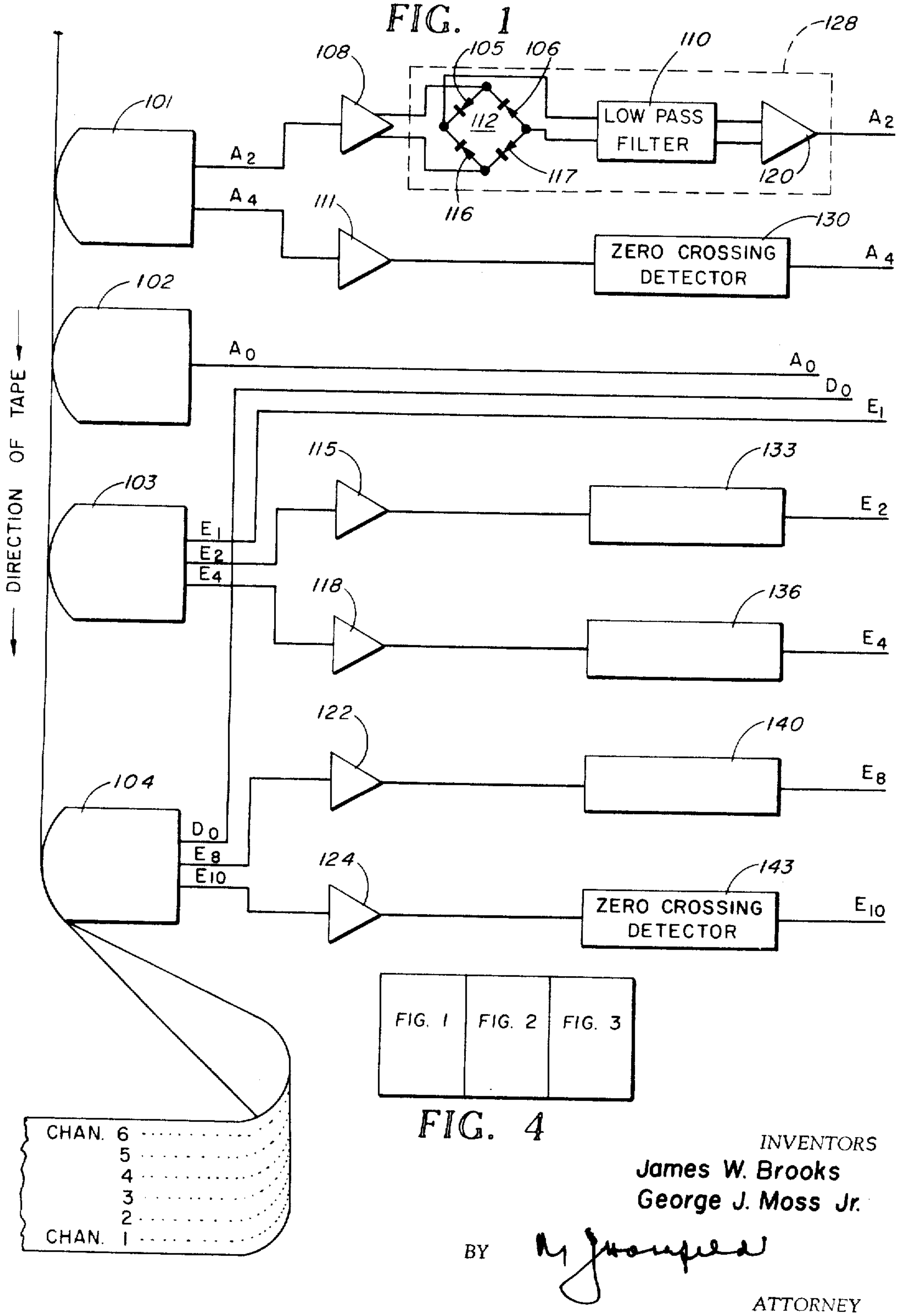
Figures 2, 5:
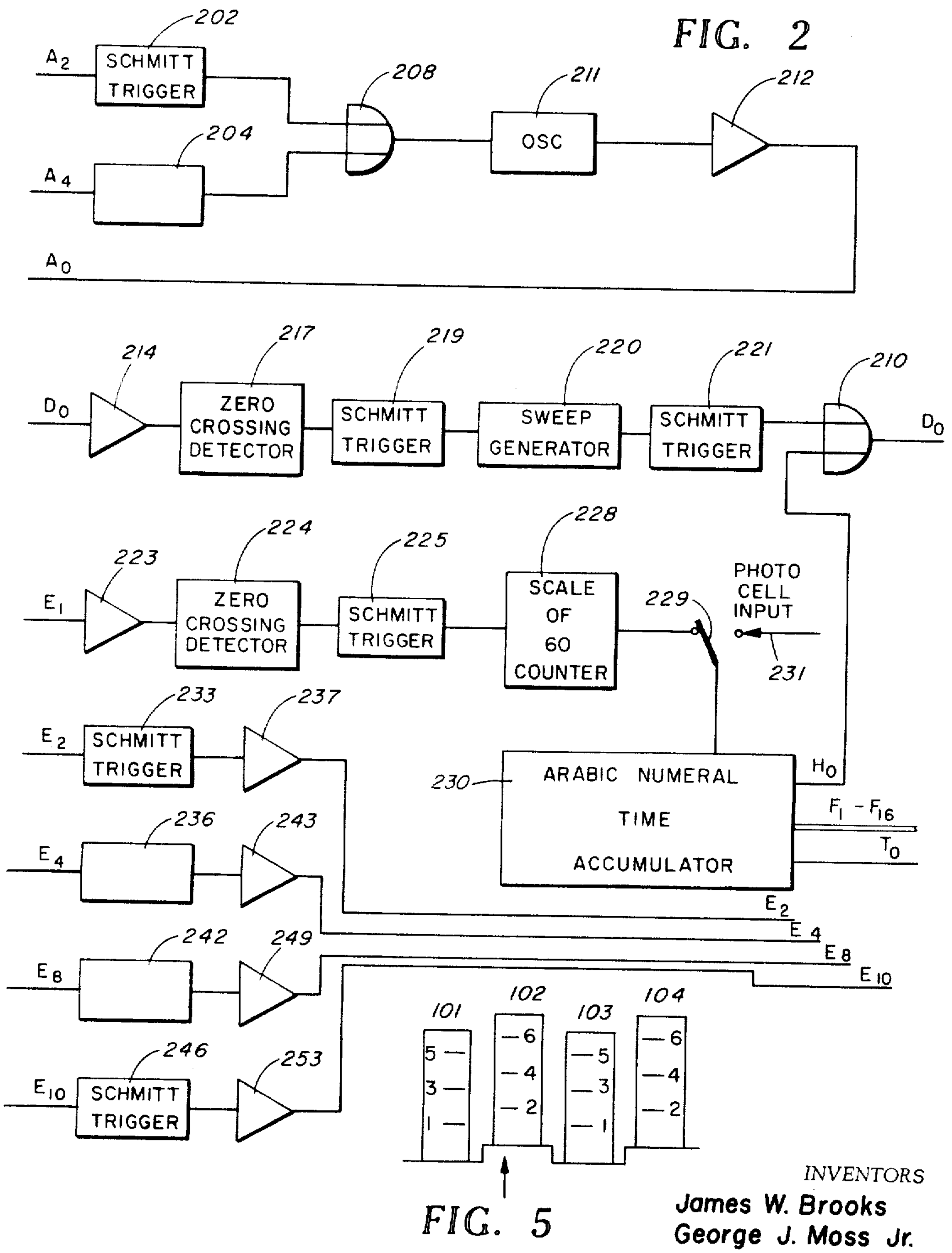
FIG. 2 is an illustration of an additional portion of the playback circuitry including the delay control channel circuitry and block diagram of the Arabic numeral time accumulator.
FIG. 5 illustrates the alignment of the magnetic heads with respect to the magnetic tape.
Figure 3:
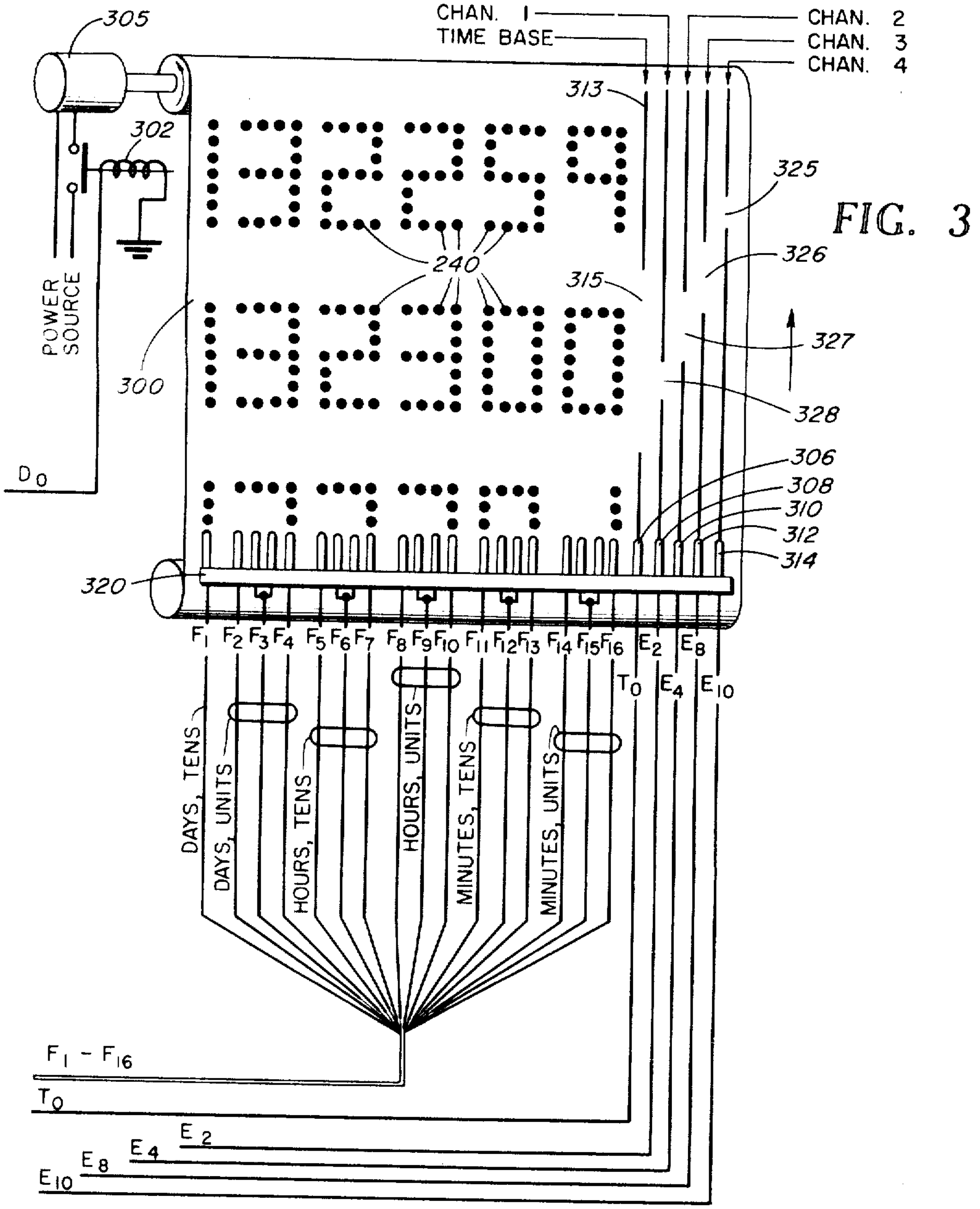
FIG. 3 illustrates the remaining portion of the playback system including the printer and control mechanism.

Referring now to FIGS. 1, 2 and 3, combined in the manner as shown in FIG. 4, the playback system can be readily understood. Magnetic tape 100 moves in the direction indicated in FIG. 1 having channels 1–4, timing channel 5, and delay control channel 6 moving in the direction indicated in FIG. 1 at a predetermined constant rate past scanner head 101, recording head 102, and data readout heads 103 and 104.

FIG. 5 shows the alignments of heads 101–104 with respect to the tape channels. The scanner head 101 and data head 103 are centered laterally on the tape, while the record head 102 and data head 104 are shimmed by half the interchannel spacing of a head.

In FIGS. 1 and 2, scanner head 101 which has output leads such as leads $A_2$ and $A_4$ associated with each data channel, picks up event signals from channels 1 and 3 on tape 100. If a signal is detected in any of the channels $A_2$ or $A_4$ a pulse is formed which passes through OR gate 208 to oscillator 211. Recording amplifier 212 then causes recording head 102 to place an events present signal in the control channel 6 on tape 100 a predetermined distance ahead of the information in data channels 1–4. If a random pulse event occurs while operating in the erasure mode, playback amplifiers 108 or 111 respond to an erasure and generate a pulse to oscillator 211 which inhibits operation of the oscillator 211 and permits a gap to appear in the sinusoid which is normally being generated and recorded on tape control channel 6. To operate in a direct mode inverters may be inserted in channels $A_2$ and $A_4$ so that playback amplifiers 108 and 111 will be sensitive to the presence rather than the absence of a sinusoid at the scanner head.

The response time of zero crossing detectors 128 and 130 are greater than a half cycle of the sinusoid so that no zero crossing pulses are generated when there are no random pulse events present. The zero crossing detectors in the system consist of a full-wave bridge rectifier, such as rectifier 112 having diodes 105, 106, 116 and 117 and a differential amplifier such as amplifier 120. A low pass filter such as filter 110 may be inserted between the rectifier and differential amplifier of zero crossing detectors shown in FIG. 1 and the delay channel zero crossing detector shown in FIG. 2. Differential amplifier 120 is a saturated amplifier which is biased so that it is in the linear region only when an input sine wave to the rectifier is near zero. The zero crossing detectors generate negative pulses when operating in the erasure mode or positive pulses when operating in the direct mode, whenever the sinusoids cross the zero voltage level. These pulses, have their rise and fall times decreased by Schmitt triggers 202 or 204, then are gated to oscillator 211.

Data readout head 103 shows output channels $E_1$, $E_2$ and $E_4$ which may correspond to data channels 5, 1 and 3 of the magnetic tape. Spaced the greatest distance from scanner head 101 is data head 104 having readout channels $E_8$ and $E_{10}$ which correspond to data channels 2 and 4 on the magnetic tape. An input to any of the channels $E_2$, $E_4$, $E_8$ and $E_{10}$ is amplified by playback amplifier such as amplifiers 115, 118, 122 or 124, then detected by a zero crossing detector such as detectors 133, 136, 140 or 143 which provides an output to a Schmitt trigger, such as triggers 233, 236, 242 or 246. A random pulse event signal detected by any one of these channels is amplified by the appropriate amplifier 237, 243, 249 or 253 to print an indication on recording chart 300.

Pickup head 104 also has a readout channel $D_0$ which detects pulses recorded in delay channel 6. If a pulse is detected in channel 6 by data head 104, this indicates that there is random pulse information in channels 1 or 3. Pulses are amplified in channel $D_0$ by amplifier 214, detected by zero crossing detector 217 and then operated on by Schmitt trigger 219 to form a paper chart control pulse to a control mechanism of chart 300, starting the paper chart a sufficient time in advance of the event data. Sweep generator 220 and an additional Schmitt trigger 221 are provided in channel $D_0$ for controlling the delay pulse signal being sent to the chart control mechanism. There is an overriding control from lead $H_0$ in the Arabic numeral time accumulator 230 to OR gate 210 which prevents stopping of the movement of the chart paper when an Arabic numeral time print out has already been started.

Chart 300 moves in the direction indicated in FIG. 3 over rollers 305 and 309 when relay 302 is energized to connect a power source to the printer mechanism. As the chart moves event information is indicated by interruptions in printing channels 1–4 such as spaces 325, 326, 327 and 328. Printer 320 prints Arabic numerals as signals from time accumulator 230 and are received over leads F1–F16. Stylii 308, 310, 312 and 314 normally write in channels 1–4 until an event signal is received.

Time accumulator 230 keeps track of the elapsed time and controls the writing of the time in Arabic numerals in a manner fully described in the abovementioned copending application. In addition, accumulator 230 is connected to the delay circuit channel $D_0$ at OR gate 210 by way of lead $H_0$ for the purpose of providing an overriding signal. A preferred elapsed time input to accumulator 230 is readout channel $E_1$ which detects and amplifies a full wave rectifier a half cycle per second square wave from channel 5 of the magnetic tape with amplifier 223 and zero detector 224. The signal triggers the Schmitt trigger and provides a one pulse per second square wave input to the scale of 60 counter 228. The scale of 60 counter 228 is also fully described in the above copending application.

When there is event information to be printed out, accumulator 230 writes a one minute on, 317, and one minute off, 315, time indication over lead $T_0$. The black portions of the broken line in the time base channel of FIG. 3 are the write signals which correspond to odd minutes while the white portions correspond to even minutes of recording time. The playback system prints out Arabic numerals 240 along with the occurrence of an event written in channels 1–4 on the chart paper. The Arabic numerals, for example, (1 3 2 3 0 0) give the time of an event as 13th day, the 23rd hour, zero minutes. At this time events started and ended in channels 1 and 2 and an event ended in channel 3. A broken time line may be used to estimate the number of seconds by interpolation.

The high speed playback system described herein when in operation detects random event information which has been previously stored on magnetic tape, provides a delayed advance starting pulse to a paper chart control mechanism for print out of the event information a short time later, and controls the intermittent printing of the event of the information by advancing the chart when there is information to be printed and by controlling the printing of the corresponding time of an event in an Arabic numeral format.

It should be understood, of course, that the foregoing disclosure relates to only preferred embodiments of the invention and that numerous modifications or alternations may be made therein without departing from the spirit and scope of the invention as set forth in the appended claims. For example, a greater number of channels may be used on the magnetic tape and additional channels are anticipated in the playback system; also, one data head may be used for readout of information instead of two.

What is claimed as new and desired to be secured by Letters Patent of the United States is:

1. A playback system for readout of random pulse event information from a magnetic tape being moved at a predetermined rate having a plurality of data channels and a control channel, comprising, scanning means for detecting pulse events registered on said data channels and initiating an event present signal, recording means spaced apart from said scanning means in the direction of the movement of said tape for registering an event present signal in said control channel of said tape, pulse forming means connected to said scanning means and responsive to a signal from said scanning means to control the registering of said event present signal in said control channel a predetermined distance ahead of event information in the data tape channels, data readout means spaced apart from said recorder means in the direction of the movement of said tape, said readout means having a plurality of data channels and a printer control channel for reading data and control information from said moving tape, printer means having a recording chart and a chart control mechanism, said mechanism responsive to a signal from the printer control readout portion of said readout means for initiating the movement of said chart a predetermined time in advance of the readout of information by said data readout means, whereby said chart is advanced only when event information is present to be printed.

2. In the apparatus as recited in claim 1 where said pulse forming means includes oscillator means normally generating a signal to said recording means, and said scanning means has a detector circuit for detecting erasures in prerecorded signals in said tape data channels for inhibiting the operation of said oscillator means providing an interruption in said control channel signal.

3. The apparatus as recited in claim 1 wherein said pulse forming means includes, oscillator means in a normally off condition operable when in an on condition to generate an event present control signal to said recording means, and gating means connected to the input of said oscillator means providing a pulse to said oscillator means to trigger said oscillator means to an on condition when random pulse event signals are detected in any of said data channels.

4. The apparatus as recited in claim 1 wherein said data readout means comprises a first readout circuit and a second readout circuit each circuit having a readout head, and a plurality of data readout channels, said second circuit further including said printer control channel, and wherein said first head is spaced in front of said second head by a predetermined length so that the tape moves past the first head a predetermined time before said second head.

5. The apparatus as recited in claim 2 further comprising an "or" gate for coupling said scanning means to said oscillator and an output recording amplifier connected between said oscillator and said recording means, wherein said scanning means includes a scanning head and a plurality of detection channels; each of said channels having a low pass filter and a zero-crossing detector connected to an output of said scanning head, and a trigger circuit connected to the output of said detector for producing an events present signal to an input of the "or" gate.

6. The apparatus of claim 3 further comprising an "or" gate for coupling said scanning means to said oscillator, and an output recording amplifier connected between said oscillator and said recording means wherein said scanning means includes a scanning head and a plurality of detection channels; each channel having a zero-crossing detector and a trigger circuit for producing an events present signal to an input of the "or" gate.

7. The apparatus as recited in claim 1 wherein said printer control channel comprises a playback amplifier and a zero-crossing detector connected in cascade for detecting a signal in said tape control channel, and a trigger circuit for producing a pulse for initiating the movement of said chart for printing of said event information thereon.

8. A playback intermittent printing system for readout of random pulse event information from a magnetic tape having a plurality of data channels and a control channel, comprising, in combination, scanner means for detecting pulse events registered on said data channels and for triggering a control pulse when event information is present in said data channels;

recording means for registering a data anticipation signal in said tape control channel;

pulse responsive means connected between said scanner means and said recording means for controlling the recording of said data anticipation signal on said tape;

data readout means having a plurality of readout channels for reading event information and printer control information in the order in which the information appears in the magnetic tape channels;

an Arabic numeral time accumulator for counting elapsed time and for controlling the printing of event occurrence time when there is event information present, and printer control means having inputs from said time accumulator and said readout channels for printing random event information and the time of occurrence of said events in Arabic numeral form.

9. The system as recited in claim 8, wherein one of said readout channels is a timing channel, further including timing means connecting said timing channel to said time accumulator for sending elapsed time pulses to said time accumulator.

10. The system as recited in claim 9, wherein said time channel includes a playback amplifier and a zero-crossing detector connected in cascade for detecting timing pulses on said magnetic tape.

11. In a playback system for printing on a recorder random pulse event information stored on a magnetic tape concurrently with the time of event occurrence in Arabic numeral format on a recorder, comprising, printer start means for detecting random event pulses and initiating a start signal to said recorder;

data readout means detecting random event pulses a predetermined time after a pulse detection by said printer start means for printing said event information in said recorder;

delay means in said printer start means for delaying said start signal a period of time which is less than said predetermined time; and time counter means responsive to the start of a playback operation for counting event elapsed time and responsive to the presence of random pulses for controlling the printing of event time in Arabic numeral format concurrently with the printing of said event information.

12. The system as recited in claim 11 wherein said delay means comprises a magnetic tape control channel, a recording head for registering signals in said channel, and additional readout means for detecting a signal registered in said control channel.

References Cited

UNITED STATES PATENTS

| | | | |
|---|---|---|---|
| 2,937,368 | 5/1960 | Newby | 340—174 |
| 3,007,137 | 10/1961 | Page et al. | 340—172.5 |
| 3,037,193 | 5/1962 | Barbagallo et al. | 340—172.5 |
| 3,085,132 | 4/1963 | Innes | 178—30 |

PAUL J. HENON, *Primary Examiner.*

R. M. RICKERT, *Assistant Examiner.*